United States Patent
Yamamoto et al.

(10) Patent No.: US 10,697,533 B2
(45) Date of Patent: Jun. 30, 2020

(54) POWER TRANSMISSION SYSTEM

(71) Applicants: TOYOTA JIDOSHA KABUSHIKI KAISHA, Toyota-shi (JP); AISIN AW CO., LTD., Anjo-shi (JP)

(72) Inventors: Kozo Yamamoto, Nagoya (JP); Hideki Nakagawa, Toyota (JP); Hirofumi Nakada, Toyota (JP); Miki Natsume, Nukata-gun (JP); Haruki Shirasaka, Anjo (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 329 days.

(21) Appl. No.: 15/602,826

(22) Filed: May 23, 2017

(65) Prior Publication Data

US 2017/0343101 A1  Nov. 30, 2017

(30) Foreign Application Priority Data

May 25, 2016 (JP) .................................. 2016-103973

(51) Int. Cl.
  *F16H 57/04* (2010.01)
  *F16H 37/02* (2006.01)

(52) U.S. Cl.
  CPC ..... *F16H 57/0471* (2013.01); *F16H 57/0431* (2013.01); *F16H 57/0489* (2013.01); *F16H 37/022* (2013.01)

(58) Field of Classification Search
  CPC .. F16H 57/042; F16H 57/043; F16H 57/0431; F16H 57/0471; F16H 57/0469;
  (Continued)

(56) References Cited

U.S. PATENT DOCUMENTS 4,644,815 A * 2/1987 Kawano ................. F16H 3/089
  184/6.12
4,930,601 A * 6/1990 Leidecker ................. F16N 7/36
  184/6.11
(Continued)

FOREIGN PATENT DOCUMENTS

JP   2007-100880       4/2007
JP   2013-170594 A    9/2013
(Continued)

OTHER PUBLICATIONS

JP2007100880A_Translation; Lubricating Oil Delivering Structure for Transmission; Yumoto, Yasuaki; Published: Apr. 19, 2007; Espacenet (Year: 2007).*

*Primary Examiner* — Michael R Mansen
*Assistant Examiner* — Raveen J Dias
(74) *Attorney, Agent, or Firm* — Oblon, McClelland, Maier & Neustadt, L.L.P.

(57) ABSTRACT

A power transmission system includes a first case, a second case, a first tube, and a shaft. The first tube is configured to supply a lubricating oil to a first bearing and a second bearing. A shaft is rotatably supported by the first bearing and the second bearing. The shaft is provided with a through-hole extending through the shaft in an axial direction of the shaft. The first tube is insertedly fixed to an insertion hole of the first case from an outside of a space where the shaft is disposed. The first tube includes a first opening and a second opening, the first opening is configured to supply the lubricating oil to the first bearing, and the second opening is configured to supply the lubricating oil to the second bearing via the through-hole of the shaft.

7 Claims, 3 Drawing Sheets

(58) Field of Classification Search
CPC ............. F16H 57/0489; F16H 57/0421; F16H 57/0423; F16H 57/0424; F16H 57/0426; F16H 57/0456; F16H 37/084; F16H 37/0846; F16H 37/0833; F16H 57/0432; F16D 58/123

See application file for complete search history.

(56) References Cited

U.S. PATENT DOCUMENTS

| | | | | |
|---|---|---|---|---|
| 4,940,446 | A * | 7/1990 | Inui | B60K 17/22 474/144 |
| 4,998,600 | A * | 3/1991 | Fuhrer | F16C 19/364 184/6.1 |
| 5,154,517 | A * | 10/1992 | Hodge | F16C 33/4623 384/470 |
| 5,558,180 | A * | 9/1996 | Yanagisawa | F16C 19/54 184/11.2 |
| 5,720,216 | A * | 2/1998 | Haka | F16H 57/043 184/6.12 |
| 5,821,653 | A * | 10/1998 | Kinto | B60K 1/00 310/89 |
| 8,439,019 | B1 * | 5/2013 | Carlson | F16H 7/20 123/559.1 |
| 2001/0008194 | A1 * | 7/2001 | Hori | F16H 57/0404 184/6.25 |
| 2001/0023790 | A1 * | 9/2001 | Hasegawa | B60K 6/387 180/339 |
| 2002/0033314 | A1 * | 3/2002 | Kato | F16D 25/123 192/70.12 |
| 2002/0049113 | A1 * | 4/2002 | Watanabe | F16C 19/46 476/8 |
| 2003/0070877 | A1 * | 4/2003 | Min | F16H 57/043 184/6.12 |
| 2005/0205359 | A1 * | 9/2005 | Miller | F16H 57/043 184/6.12 |
| 2005/0239592 | A1 * | 10/2005 | Schoenek | B62J 13/00 474/144 |
| 2006/0276293 | A1 * | 12/2006 | Koyama | F16H 37/0846 475/207 |
| 2008/0184834 | A1 * | 8/2008 | Eckert | F16H 57/043 74/467 |
| 2009/0165586 | A1 * | 7/2009 | Ariga | F16H 57/0423 74/467 |
| 2009/0221391 | A1 * | 9/2009 | Bazyn | F16H 15/52 475/159 |
| 2009/0247341 | A1 * | 10/2009 | Abe | B60K 6/26 475/5 |
| 2013/0139633 | A1 * | 6/2013 | Baik | F16H 57/0426 74/473.11 |
| 2013/0213740 | A1 * | 8/2013 | Tanaka | F16H 57/043 184/6.12 |
| 2013/0283955 | A1 * | 10/2013 | Araki | F16H 57/0423 74/467 |
| 2013/0283972 | A1 * | 10/2013 | Yamamoto | B60K 6/405 74/665 B |
| 2013/0316866 | A1 * | 11/2013 | Kawamura | F16H 57/027 475/160 |
| 2014/0083219 | A1 * | 3/2014 | Wang | F16D 23/12 74/405 |
| 2015/0080134 | A1 * | 3/2015 | Tage | F16H 57/0426 464/7 |
| 2015/0252945 | A1 * | 9/2015 | Rippelmeyer | F16H 57/043 475/160 |
| 2015/0283992 | A1 * | 10/2015 | Kawai | B60K 6/383 475/2 |
| 2015/0285368 | A1 * | 10/2015 | McLauchlan | F16H 57/046 184/6.12 |
| 2015/0362060 | A1 * | 12/2015 | Fukasawa | F16H 57/043 184/6.12 |
| 2016/0061305 | A1 * | 3/2016 | Kim | F16H 37/046 475/5 |
| 2016/0201792 | A1 * | 7/2016 | Naruoka | F16H 57/0456 475/159 |
| 2016/0214473 | A1 * | 7/2016 | Kanada | B60K 6/365 |
| 2017/0036538 | A1 * | 2/2017 | Imafuku | B60K 17/3467 |
| 2017/0108108 | A1 * | 4/2017 | Fujimoto | F16H 57/028 |
| 2017/0146110 | A1 * | 5/2017 | Galab | F16H 57/043 |
| 2017/0175863 | A1 * | 6/2017 | Kramer | F16H 61/32 |
| 2017/0210315 | A1 * | 7/2017 | Nakajima | B60K 6/24 |
| 2018/0058569 | A1 * | 3/2018 | Slayter | F02C 7/275 |
| 2018/0087655 | A1 * | 3/2018 | Arnelof | F16H 57/0449 |
| 2018/0135740 | A1 * | 5/2018 | Kodama | F16H 57/04 |
| 2018/0180113 | A1 * | 6/2018 | Tokito | F16H 57/0473 |
| 2018/0274660 | A1 * | 9/2018 | Kita | F16H 57/0445 |
| 2018/0283527 | A1 * | 10/2018 | Sasaki | F16H 57/043 |
| 2019/0229582 | A1 * | 7/2019 | Ito | F16H 57/0457 |
| 2019/0249765 | A1 * | 8/2019 | Ito | F16H 57/0424 |

FOREIGN PATENT DOCUMENTS

| | | |
|---|---|---|
| JP | 2016-31136 A | 3/2016 |
| JP | 2016-40475 A | 3/2016 |
| WO | WO 2015/071948 A1 | 5/2015 |
| WO | WO 2015/150407 A1 | 10/2015 |

* cited by examiner

POWER TRANSMISSION SYSTEM

INCORPORATION BY REFERENCE

The disclosure of Japanese Patent Application No. 2016-103973 filed on May 25, 2016 including the specification, drawings and abstract is incorporated herein by reference in its entirety.

BACKGROUND

1. Technical Field

The present disclosure relates to a power transmission system, and particularly to a structure to lubricate a power transmission system.

2. Description of Related Art

Conventionally, there have been known structures to lubricate power transmission systems (see Japanese Patent Application Publication No. 2007-100880, for example).

A power transmission system disclosed in JP 2007-100880 A is configured to lubricate bearings of a counter shaft. The counter shaft is disposed between an automatic transmission and a differential mechanism, and is placed in a space between a case and a housing. One end of the counter shaft is rotatably supported via the bearing by the case, and the other end thereof is rotatably supported via the bearing by the housing.

The counter shaft is provided with a through-hole extending through the counter shaft in the axial direction, and a lubricating pipe is disposed in the through-hole. The case and the housing are provided with a case-support hole and a housing-support hole, respectively such that these holes face respective openings of the through-hole. One side of the lubricating pipe is inserted into the case-support hole, while the other side of the lubricating pipe is inserted into the housing-support hole, thereby supporting the lubricating pipe.

A first hole is formed in a part of the lubricating pipe between the case and the counter shaft, while a second hole is formed in a part of the lubricating pipe between the housing and the counter shaft. The lubricating oil is discharged from the first hole of the lubricating pipe so as to supply the lubricating oil to the bearing provided to the case, and the lubricating oil is discharged from the second hole of the lubricating pipe so as to supply the lubricating oil to the bearing provided to the housing.

SUMMARY

Unfortunately, in the aforementioned conventional structure to lubricate the power transmission system, the bearings of the counter shaft can be lubricated, but the lubricating pipe is needed to be inserted into the case-support hole and the housing-support hole. Hence, a high positioning accuracy is required, which raises a problem that the difficulty of an assembly work becomes high.

The present disclosure provides a power transmission system capable of reducing the difficulty of an assembly work.

A power transmission system according to one aspect of the present disclosure includes a first case, a second case, a first tube, and a shaft. The first case includes a first bearing. The second case includes a second bearing. The first tube is configured to supply a lubricating oil to the first bearing and the second bearing. The shaft is disposed in a space between the first case and the second case. The shaft is rotatably supported by the first bearing and the second bearing. The shaft is provided with a through-hole extending through the shaft in an axial direction of the shaft. The first case includes an insertion hole into which the first tube is inserted on an extension in the axial direction of the shaft. The first tube is insertedly fixed to the insertion hole of the first case from an outside of the space where the shaft is disposed. The first tube includes a first opening and a second opening, the first opening is configured to supply the lubricating oil to the first bearing, and the second opening is configured to supply the lubricating oil to the second bearing via the through-hole of the shaft.

According to the power transmission system of the aspect, the first tube is insertedly fixed to the insertion hole of the first case from the outside of the space where the shaft is disposed; therefore, it is unnecessary to position the first tube relative to the second case, thus reducing the difficulty of the assembly work.

In the power transmission system according to the above aspect, the shaft may include a gear relatively rotatably supported via a third bearing. The shaft may include a clutch configured to selectively couple the gear and the shall to each other. The second opening of the first tube may be configured to supply the lubricating oil to the second bearing and the third bearing.

According to the power transmission system of the aspect, it is possible to lubricate the third bearing in addition to the first bearing and the second bearing.

In the power transmission system according to the above aspect, there may further be provided a continuously variable transmission. There may further be provided a second tube to supply the lubricating oil to a transmission belt of the continuously variable transmission. The first tube may branch from the second tube.

According to the power transmission system of the aspect, since it is unnecessary to provide an oil passage dedicated to supplying the lubricating oil to the first tube, it is possible to suppress increase of the number of components.

In the power transmission system according to the above aspect, there may further be provided a continuously variable transmission. There may be provided a first power transmission path arranged via the shaft and not via the continuously variable transmission. There may be provided a second power transmission path provided in parallel to the first power transmission path, the second power transmission path arranged via the continuously variable transmission.

According to the power transmission system of the aspect, it is possible to lubricate the first bearing and the second bearing of the shaft in the first power transmission path.

According to the power transmission system of the present disclosure, it is possible to reduce the difficulty of the assembly work of the first tube for the lubrication.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, one embodiment of the present disclosure will be described with reference to the drawings. In the present embodiment, there will be described the case of applying the present disclosure to a transaxle installed in a vehicle.

—Schematic Configuration of Vehicle—

First, with reference to FIG. 1, a schematic configuration of a vehicle 100 will be described. The vehicle 100 is, for example, an FF (front-engine front-drive)-type vehicle in which a power train is horizontally arranged.

Figure 1:
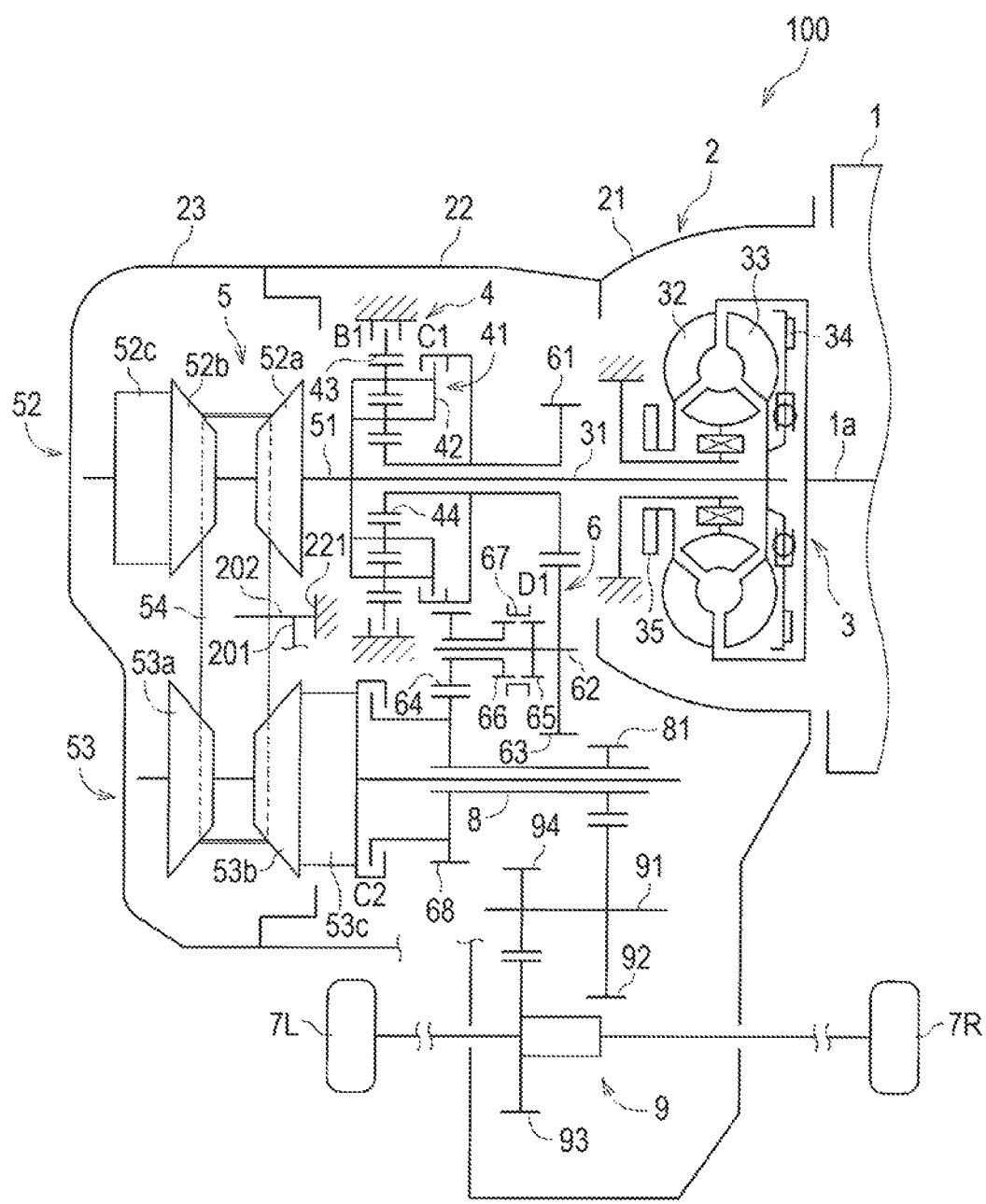
FIG. 1 is an outline view showing a schematic configuration of a vehicle including a transaxle to which the present disclosure is applied.

As shown in FIG. 1, the vehicle 100 includes an engine 1 as a drive power source for traveling, and a transaxle 2 that transmits torque (motive power) outputted from the engine 1 to driven wheels 7L, 7R.

[Engine]

The engine 1 is a multiple-cylinder gasoline engine, for example, and is configured to capable of outputting drive power for traveling. The engine 1 is capable of controlling driving conditions, such as a throttle opening (amount of intake air) of a throttle valve provided to an intake passage, an amount of fuel injection, and ignition timing.

[Transaxle]

A torque converter 3, a forward-backward movement switching unit 4, a belt-type continuously variable transmission (hereinafter, referred to simply as a "continuously variable transmission") 5, a gear mechanism 6, an output shaft 8, a differential unit 9, and others are disposed inside the transaxle 2. A cabinet for housing these components of the transaxle 2 therein is composed of a housing 21, a case 22, and a cover 23. The housing 21 is fixed on the output side of the engine 1. The case 22 is fixed to the housing 21 on the side opposite to the engine 1. The cover 23 is fixed to the case 22 on the side opposite to the housing 21.

In the transaxle 2, a first power transmission path arranged not via the continuously variable transmission 5 and a second power transmission path arranged via the continuously variable transmission 5 are provided in parallel to each other. Specifically, in the first power transmission path, torque outputted from the engine 1 is inputted via a torque converter 3 into a turbine shaft 31, and the torque is transmitted from the turbine shaft 31 via the forward-backward movement switching unit 4 and the gear mechanism 6 to an output shaft 8. On the other hand, in the second power transmission path, torque inputted into the turbine shaft 31 is transmitted via the continuously variable transmission 5 to the output shaft 8. In addition, the transaxle 2 is configured to switch the power transmission path between the first power transmission path and the second power transmission path depending on the traveling condition of the vehicle 100.

[Torque Converter]

The torque converter 3 includes a pump impeller 32 on the input side, a turbine runner 33 on the output side, and others, and is configured to carry out power transmission between the pump impeller 32 and the turbine runner 33 via a fluid (operating oil). The pump impeller 32 is coupled to a crank shaft 1a of the engine 1, and the turbine runner 33 is coupled to the forward-backward movement switching unit 4 via the turbine shaft 31. The torque converter 3 is provided with a lockup clutch 34, and the lockup clutch 34 comes into engagement so as to integrally rotate the pump impeller 32 and the turbine runner 33 with each other. An oil pump 35 is coupled to the pump impeller 32 of the torque converter 3.

[Forward-Backward Movement Switching Unit]

The forward-backward movement switching unit 4 includes a forward-movement clutch (gear-traveling clutch) C1, a backward-movement brake B1, and a double-pinion-type planetary gear unit 41. In the planetary gear unit 41, a carrier 42 is integrally coupled to the turbine shaft 31 and an input shaft 51 of the continuously variable transmission 5, a ring gear 43 is selectively coupled to the case 22 via the backward-movement brake B1, and a sun gear 44 is coupled to a small-diameter gear 61. The sun gear 44 and the carrier 42 are selectively coupled to each other via the forward-movement clutch C1.

[Gear Mechanism]

The gear mechanism 6 includes: the small-diameter gear 61; and a large-diameter gear 63 that comes into mesh with the small-diameter gear 61, and is rotationally fixed relative to a first counter shaft 62. An idler gear 64 is provided around the same rotational axis as that of the first counter shaft 62 in such a manner as to be relatively rotatable with respect to the first counter shaft 62. Between the first counter shaft 62 and the idler gear 64, there is provided a dog clutch D1 that selectively couples these components. The dog clutch D1 includes: a first gear 65 formed to the first counter shaft 62; a second gear 66 formed to the idler gear 64; and a hub sleeve 67 provided with spline teeth meshable with the first gear 65 and the second gear 66. The hub sleeve 67 is fitted to the first gear 65 and the second gear 66 so as to couple the first counter shaft 62 to the idler gear 64. The idler gear 64 meshes with an input gear 68 having a larger diameter than that of the idler gear 64. The input gear 68 is rotationally fixed relative to the output shaft 8. A detailed structure around the first counter shaft 62 will be described later.

[Continuously Variable Transmission]

The continuously variable transmission 5 is provided on the power transmission path between the input shaft 51 coupled to the turbine shaft 31 and the output shaft 8. The continuously variable transmission 5 includes: a primary pulley 52 that is a member on the input side, and is provided to the input shaft 51; a secondary pulley 53 that is a member on the output side; and a transmission belt 54 wound between the pair of pulleys 52, 53.

The primary pulley 52 includes: a fixed sheave 52a fixed to the input shaft 51; a movable sheave 52b so provided as to be rotationally fixed relative to the input shaft 51 around the axis thereof and movable in the axial direction; and a hydraulic actuator 52c on the primary side that generates driving force to move the movable sheave 52b so as to change a V-groove width between these sheaves. The secondary pulley 53 includes: a fixed sheave 53a; a movable sheave 53b so provided as to be rotationally fixed relative to the fixed sheave 53a around the axis thereof and movable in the axial direction; a hydraulic actuator 53c on the secondary side that generates driving force to move the movable sheave 53b so as to change a V-groove width between these sheaves.

In the continuously variable transmission 5, the V-groove widths of the pair of pulleys 52, 53 are changed so as to change an applied diameter (effective diameter) of the transmission belt 54, thereby making the transmission gear ratio continuously variable. In addition, a belt-traveling clutch C2 is provided between the secondary pulley 53 of the continuously variable transmission 5 and the output shaft 8 so as to selectively couple these components.

[Output Shaft]

An output gear 81 is rotationally fixed relative to the output shaft 8. The output gear 81 meshes with a large-diameter gear 92 fixed to a second counter shaft 91. The second counter shaft 91 is provided with a small-diameter gear 94 meshing with a deferential ring gear 93 of the differential unit 9. The differential unit 9 is composed of a known differential mechanism.

—Traveling Pattern of Vehicle—

In the vehicle 100, it is possible to carry out the gear traveling in which the power is transmitted via the first power transmission path and the belt traveling in which the power is transmitted via the second power transmission path. For example, the gear traveling is selected in a low vehicle-speed region, and is then switched to the belt traveling when the vehicle 100 comes out of the low vehicle-speed region.

[Gear Traveling]

During the gear traveling, the forward-movement clutch C1 and the dog clutch D1 come into engagement, while the backward-movement brake B1 and the belt-traveling clutch C2 come out of engagement.

Specifically, the forward-movement clutch C1 comes into engagement so that the carrier 42 of the planetary gear unit 41 is coupled to the sun gear 44, thereby integrally rotating the turbine shaft 31 with the small-diameter gear 61. The dog clutch D1 comes into engagement, thereby integrally rotating the first counter shaft 62 coupled with the idler gear 64. Hence, the forward-movement clutch C1 and the dog clutch D1 come into engagement, thereby establishing the first power transmission path; therefore, the torque outputted from the engine 1 is transmitted via the torque converter 3, the turbine shaft 31, the forward-backward movement switching unit 4, the gear mechanism 6, the idler gear 64, and the input gear 68 to the output shaft 8. The torque transmitted to the output shaft 8 is transmitted via the output gear 81, the large-diameter gear 92, the small-diameter gear 94, and the differential unit 9 to the left and right driven wheels 7L, 7R.

[Belt Traveling]

During the belt traveling, the belt-traveling clutch C2 comes into engagement, and the forward-movement clutch C1, the backward-movement brake B1, and the dog clutch D1 come out of engagement.

Specifically, the belt-traveling clutch C2 comes into engagement so as to couple the secondary pulley 53 and the output shaft 8 to each other, thereby integrally rotating the secondary pulley 53 with the output shaft 8. Hence, the belt-traveling clutch C2 comes into engagement, thereby establishing the second power transmission path; therefore, the torque outputted from the engine 1 is transmitted via the torque converter 3, the turbine shaft 31, the input shaft 51, and the continuously variable transmission 5 to the output shaft 8. The torque transmitted to the output shaft 8 is then transmitted via the output gear 81, the large-diameter gear 92, the small-diameter gear 94, and the differential unit 9 to the left and right driven wheels 7L, 7R.

[Backward Traveling]

During the backward traveling, the backward-movement brake B1 and the dog clutch D1 come into engagement, and the forward-movement clutch C1 and the belt-traveling clutch C2 come out of engagement. In this case, the small-diameter gear 61 is rotated in a reverse direction to the rotational direction of the turbine shaft 31; thus the reverse rotation is transmitted via the gear mechanism 6, the idler gear 64, the input gear 68, and others to the left and right driven wheels 7L, 7R.

—Lubricating Structure to Lubricate Bearings of First Counter Shaft—

Next, with reference to FIG. 1 to FIG. 3, a lubricating structure 200 that lubricates bearings 69a to 69c of the first counter shaft 62 will be described. Before describing the lubricating structure 200, a structure around the first counter shaft 62 will be described. The transaxle 2 includes the first power transmission path that is arranged via the first counter shaft 62 but not via the continuously variable transmission 5, and the second power transmission path that is arranged via the continuously variable transmission 5 and provided in parallel to the first power transmission path. The lubricating structure 200 is configured to lubricate the bearings 69a to 69c of the first counter shaft 62 of the first power transmission path.

Figure 2:
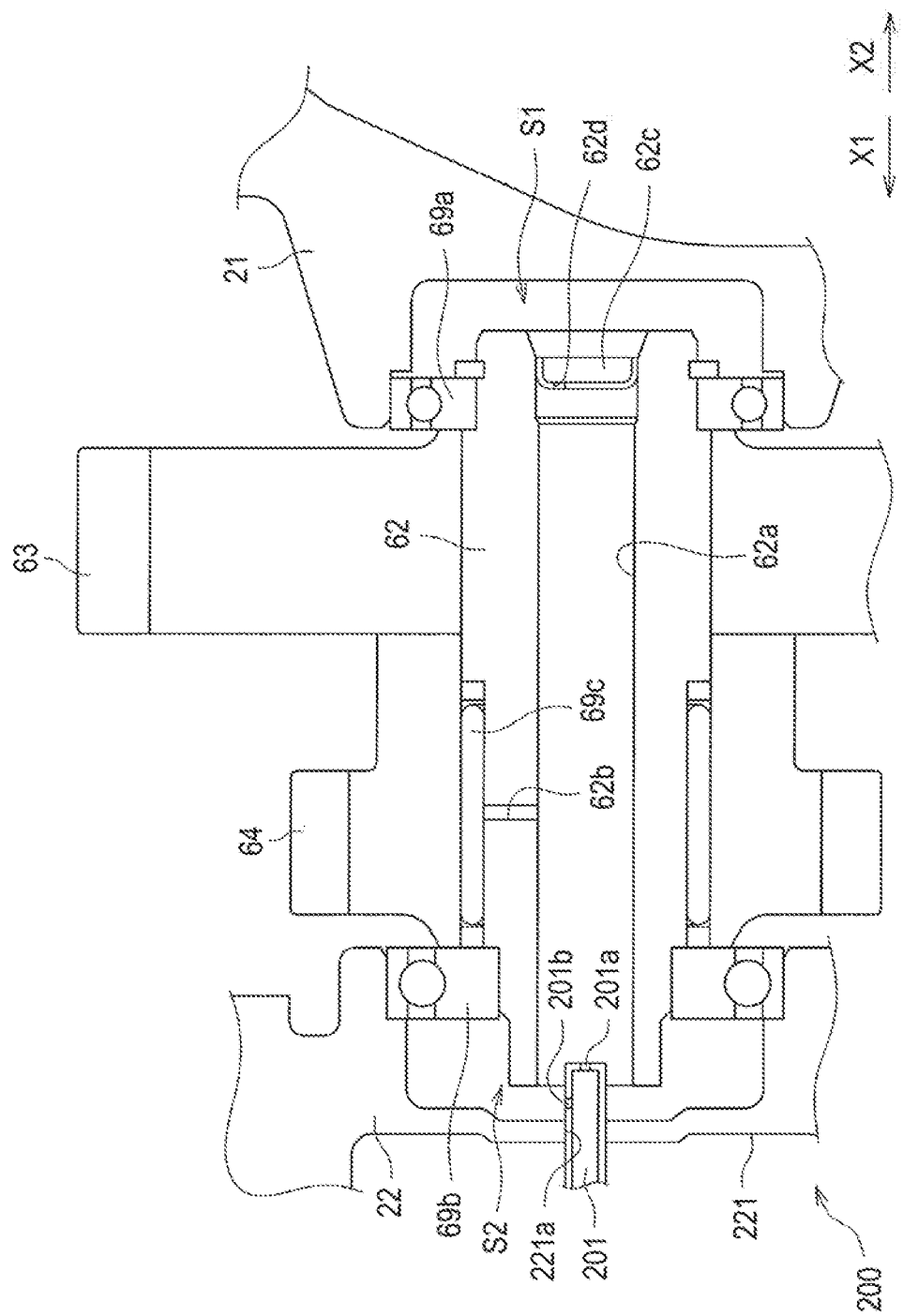
FIG. 2 is a view showing a first counter shaft provided to the transaxle of FIG. 1 and a vicinity thereof.

As shown in FIG. 2, the first counter shaft 62 is disposed in a space between the housing 21 and the case 22. One end (end in the X2 direction) of the first counter shaft 62 is rotatably supported by the bearing 69a provided to the housing 21, while the other end (end in the X1 direction) of the first counter shaft 62 is rotatably supported by the bearing 69b provided to the case 22. The first counter shaft 62 is one example of a "shaft". The housing 21 is one example of a "second case", the case 22 is one example of a "first case", the bearing 69a is one example of a "second bearing", and the bearing 69b is one example of a "first bearing".

Around the outer circumference of the first counter shaft 62, the large-diameter gear 63 is relatively rotationally fixed on one side between the bearing 69a and the bearing 69b, while the idler gear 64 is provided to be relatively rotatable on the other side between the bearing 69a and the bearing 69b. The bearing 69c is provided between the idler gear 64 and the first counter shaft 62. The idler gear 64 and the first counter shaft 62 are configured to be selectively coupled to each other by the dog clutch D1 (see FIG. 1). The idler gear 64 is one example of a "gear", the dog clutch D1 is one example of a "clutch", and the bearing 69c is one example of a "third bearing".

The lubricating structure 200 for the bearings 69a to 69c of the first counter shaft 62 includes a tube 201 for supplying a lubricating oil to the bearings 69a to 69c. The tube 201 is fixed to the case 22, and includes an opening 201a for supplying the lubricating oil to the bearings 69a, 69c, and an opening 201b for supplying the lubricating oil to the bearing 69b. The tube 201 is one example of a "first tube", the opening 201a is one example of a "second opening", and the opening 201b is one example of a "first opening".

Here, the first counter shaft 62 is formed with a through-hole 62a extending therethrough in the axial direction, and also with a communication hole 62b allowing the through-hole 62a to communicate with the bearing 69c. The through-hole 62a is so formed as to axially extend along the rotational center of the first counter shaft 62. The communication hole 62b is so formed as to extend in the radial direction of the first counter shaft 62.

One end of the through-hole 62a is provided with a plug 62c, and the one end of the through-hole 62a is closed by the plug 62c. The plug 62c is formed with a communication hole 62d that allows the inside of the through-hole 62a to communicate with a space S1. The space S1 is a space partitioned by the housing 21, the first counter shaft 62, and the bearing 69a. The other end of the through-hole 62a is opened, and a front end of the tube 201 is disposed thereinside.

The case 22 is formed with an insertion hole 221a into which the tube 201 is inserted on an extension in the axial direction of the first counter shaft 62. That is, the insertion hole 221a is disposed at a position corresponding to the through-hole 62a as viewed from the axial direction of the first counter shaft 62. The tube 201 is inserted into the insertion hole 221a from the outside of the space where the first counter shaft 62 is disposed, and the tube 201 is insertedly fixed to the insertion hole 221a of the case 22. In other words, the tube 201 is inserted into the insertion hole 221a, thereby supporting (holding) the tube 201 to the case 22. That is, by inserting the tube 201 into the insertion hole 221a, the tube 201 is positioned and fixed relative to the case 22.

The opening 201a is formed at the front end of the tube 201 in such a manner as to face the through-hole 62a of the first counter shaft 62. This means that the opening 201a is configured to be disposed in the through-hole 62a so as to supply the lubricating oil to the through-hole 62a. The lubricating oil inside the through-hole 62a is supplied via the communication hole 62d of the plug 62c and the space S1 to the bearing 69a, and also supplied via the communication hole 62b to the bearing 69c.

The opening 201b is formed in a circumferential surface located closer to the front end of the tube 201 in such a manner as to face a space S2. The space S2 is a space partitioned by the case 22, the first counter shaft 62, and the bearing 69b. Specifically, the opening 201b is disposed between the first counter shaft 62 and the case 22 so as to supply the lubricating oil via the space S2 to the bearing 69b.

As shown in FIG. 1, the tube 201 branches from a tube 202. The tube 202 is provided to supply the lubricating oil to a transmission belt 54 of the continuously variable transmission 5. A discharge hole (not shown) is provided at the front end of the tube 202, and the lubricating oil discharged from the discharge hole is supplied to the transmission belt 54. The tube 202 is one example of a "second tube" of the present disclosure.

A base end of the tube 202 is connected to an oil passage (not shown) provided inside a wall portion 221 of the case 22, and the oil passage is connected to an oil pump 35. The tube 202 is fixed to the wall portion 221, and is so formed as to extend from the wall portion 221 to the cover 23 side. That is, the tube 202 is so formed as to extend in the vehicle-width direction (right-left direction). Hence, the tube 202 is disposed in the space between the case 22 and the cover 23.

Figure 3:
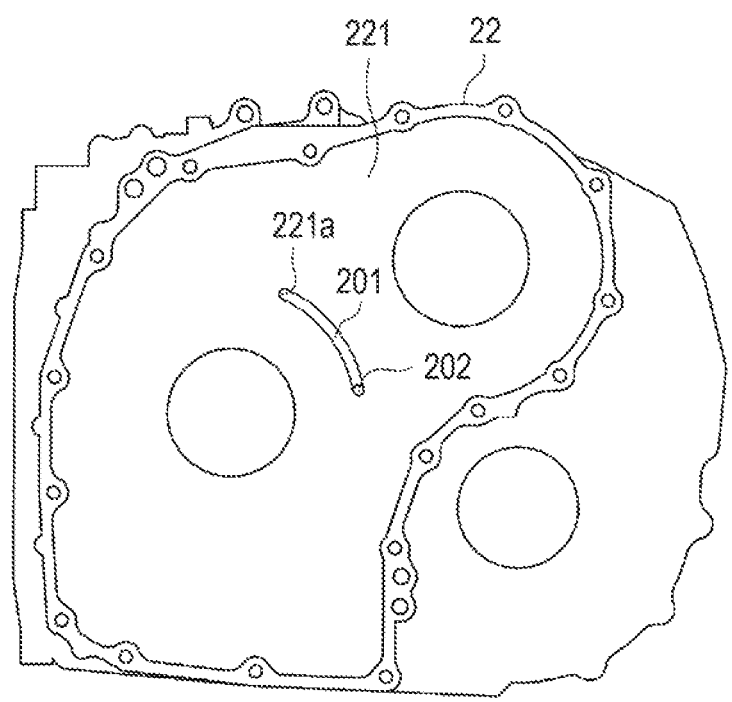
FIG. 3 is a schematic view of a case of the transaxle of FIG. 1, as viewed from the side where the cover is attached.

As shown in FIG. 3, the tube 201 branching from the tube 202 is so formed as to extend along the wall portion 221, and is disposed between the primary pulley 52 and the secondary pulley 53 (see FIG. 1) if viewed from the vehicle-width direction. Hence, a large part of the tube 201 is disposed in the space between the case 22 and the cover 23 (see FIG. 1), and as shown in FIG. 2, the tube 201 is fixed in such a manner that a front end part thereof is inserted into the insertion hole 221a of the case 22 so as to be introduced into the space between the case 22 and the housing 21.

In the above described lubricating structure 200, the lubricating oil discharged from the oil pump 35 is supplied via the oil passage (not shown) to the tube 202, and is also supplied to the tube 201 branching from the tube 202. The lubricating oil discharged from the discharge hole (not shown) of the tube 202 is then supplied to the transmission belt 54 of the continuously variable transmission 5.

Furthermore, the lubricating oil is supplied from the opening 201a of the tube 201 to the through-hole 62a of the first counter shaft 62, and the lubricating oil in the through-hole 62a is supplied via the communication hole 62d of the plug 62c and the space S1 to the bearing 69a, and is also supplied via the communication hole 62b to the bearing 69c. In addition, the lubricating oil discharged from the opening 201b of the tube 201 is supplied via the space S2 to the bearing 69b.

A supply amount of the lubricating oil to the through-hole 62a of the first counter shaft 62 is set based on the opening area of the opening 201a or the like. A supply amount of the lubricating oil to the bearing 69a is set based on the opening area of the communication hole 62d or the like. A supply amount of the lubricating oil to the bearing 69b is set based on the opening area of the opening 201b or the like. A supply amount of the lubricating oil to the bearing 69c is set based on the opening area of the communication hole 62b or the like.

—Advantageous Effect—

In the present embodiment, as aforementioned, by inserting the tube 201 for lubricating the bearings 69a, 69b into the insertion hole 221a of the case 22 so as to fix the tube 201 to the case 22, it becomes unnecessary to position the tube 201 relative to the housing 21; therefore, it is possible to reduce the difficulty of the assembly work. In other words, by fixing the tube 201 to the case 22 in a cantilever state, it is possible to reduce the difficulty of the assembly work compared with the configuration of fixing the tube at both ends to the case and the housing.

By supplying the lubricating oil to the bearings 69a and 69b using the tube 201, it is possible to simplify the structures of the case 22 and the housing 21, while reducing the number of components such as plugs used when the oil passages are formed in the case and the housing, compared with the configuration in which the oil passages for supplying the lubricating oil to the bearings are formed in the case and the housing.

In the present embodiment, by forming the communication hole 62b, it is possible to lubricate the bearing 69c provided between the first counter shaft 62 and the idler gear 64, in addition to the bearings 69a, 69b rotatably supporting the first counter shaft 62.

In the present embodiment, the tube 201 branches from the tube 202 for supplying the lubricating oil to the transmission belt 54 of the continuously variable transmission 5; thus no oil passage dedicated to supplying the lubricating oil to the tube 201 is required, thereby reducing increase of the number of the components.

—Other Embodiments—

The embodiments disclosed herein are to be considered in all respects as illustrative and not as a basis for a restrictive interpretation. Therefore, the technical scope of the present disclosure is defined by the claims rather than only by the aforementioned embodiments. All variations and modifications falling within the meaning and range of equivalency of the claims are intended to be embraced in the technical scope of the present disclosure.

For example, in the present embodiment, the vehicle 100 is exemplified as an FF (front-engine front-drive)-type vehicle, but the present disclosure is not limited to this, and may be an FR (front-engine rear-drive)-type vehicle or a 4 WD-type vehicle.

In the present embodiment, it is exemplified that a multiple-cylinder gasoline engine is provided as the engine 1, but the present disclosure is not limited to this, and another different type of engine such as a diesel engine may be provided.

In the present embodiment, a part of the lubricating oil supplied from the opening 201*a* into the through-hole 62*a* may be supplied to the space S2. Likewise, a part of the lubricating oil supplied from the opening 201*b* into the space S2 may be supplied to the through-hole 62*a*.

In the present embodiment, it is exemplified that the tube 201 for supplying the lubricating oil to the bearings 69*a* to 69*c* branches from the tube 202 to supply the lubricating oil to the transmission belt 54, but the present disclosure is not limited to this; and the tube to supply the lubricating oil to the bearings may be connected to another supply source of the lubricating oil.

In the present embodiment, it is exemplified that the present disclosure is applied to the lubricating structure 200 that lubricates the bearings 69*a* to 69*c* of the first counter shaft 62 in the first power transmission path that is arranged not via the continuously variable transmission 5 of the transaxle 2, but the present disclosure is not limited to this, and may be applied to a lubricating structure that lubricates bearings of a shaft of another power transmission system.

In the present embodiment, it is exemplified that the present disclosure is applied to the lubricating structure 200 that lubricates the bearing 69*c*, the bearing 69*c* via which the idler gear 64 is provided to the first counter shaft 62, but the present disclosure is not limited to this, and may be applied to a lubricating structure that lubricates only bearings rotatably supporting a shaft of a power transmission system.

The present disclosure is applicable to a lubricating structure that lubricates a first bearing and a second bearing in a power transmission system in which a shaft disposed in a space between a first case and a second case is rotatably supported by the first bearing disposed in the first case and the second bearing disposed in the second case.

What is claimed is:

1. A power transmission system comprising:
    a first case including a first bearing;
    a second case including a second bearing;
    a cover attached to the first case on a side opposite of the second case;
    a continuously variable transmission disposed between the first case and the cover;
    a first tube configured to supply a lubricating oil to the first bearing and the second bearing; and
    a shaft disposed in a first space between the first case and the second case, the shaft being rotatably supported by the first bearing and the second bearing and being provided with a through-hole extending through the shaft in an axial direction of the shaft,
    wherein the first case includes an insertion hole between the first space and a second space which is between the first case and the cover, the first tube extending through the insertion hole in the axial direction of the shaft,
    the first tube is insertedly fixed to the insertion hole of the first case from the second space,
    the first tube includes a first opening and a second opening,
    the first opening is configured to supply the lubricating oil to the first bearing, and
    the second opening is configured to supply the lubricating oil to the second bearing via the through-hole of the shaft.

2. The power transmission system according to claim 1, wherein
    the shaft includes a gear relatively rotatably supported via a third bearing,
    the shaft includes a clutch configured to selectively couple the gear and the shaft to each other, and
    the second opening of the first tube is configured to supply the lubricating oil to the second bearing and the third bearing.

3. The power transmission system according to claim 1, further comprising:
    a second tube configured to supply the lubricating oil to a transmission belt of the continuously variable transmission,
    wherein the first tube branches from the second tube.

4. The power transmission system according to claim 1, further comprising:
    a first power transmission path arranged via the shaft and not via the continuously variable transmission; and
    a second power transmission path provided in parallel to the first power transmission path, the second power transmission path being arranged via the continuously variable transmission.

5. The power transmission system according to claim 4, further comprising:
    a second tube configured to supply the lubricating oil to a transmission belt of the continuously variable transmission,
    wherein the first tube branches from the second tube.

6. The power transmission system according to claim 1, wherein
    the second opening is on an axial end of the first tube disposed in the through-hole at an end of the through-hole opposite to the second bearing.

7. The power transmission system according to claim 1, wherein
    the first opening is on a circumferential surface of the first tube.

* * * * *